United States Patent
Takagi et al.

(10) Patent No.: US 10,622,925 B2
(45) Date of Patent: Apr. 14, 2020

(54) CONTROL DEVICE AND CONTROL METHOD

(71) Applicant: Mitsubishi Electric Corporation, Chiyoda-ku (JP)

(72) Inventors: Fumiaki Takagi, Chiyoda-ku (JP); Takahiko Kobayashi, Chiyoda-ku (JP); Masahiro Iezawa, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 302 days.

(21) Appl. No.: 15/520,134

(22) PCT Filed: Aug. 26, 2015

(86) PCT No.: PCT/JP2015/073979
§ 371 (c)(1),
(2) Date: Apr. 19, 2017

(87) PCT Pub. No.: WO2016/092910
PCT Pub. Date: Jun. 16, 2016

(65) Prior Publication Data
US 2017/0331404 A1    Nov. 16, 2017

(30) Foreign Application Priority Data

Dec. 12, 2014 (JP) ................................ 2014-251585

(51) Int. Cl.
*H02P 21/00* (2016.01)
*H02P 21/14* (2016.01)
*H02P 29/66* (2016.01)

(52) U.S. Cl.
CPC .......... *H02P 21/141* (2013.01); *H02P 29/662* (2016.11)

(58) Field of Classification Search
CPC ............................ H02P 21/141; H02P 29/662
(Continued)

(56) References Cited

U.S. PATENT DOCUMENTS 9,219,441 B2 * 12/2015 Yasui ........................ H02P 6/00
2008/0197799 A1 * 8/2008 Tomigashi ................ H02P 6/18
318/768

(Continued)

FOREIGN PATENT DOCUMENTS

JP     2001-186800 A    7/2001
JP     2005-192325 A    7/2005

(Continued)

OTHER PUBLICATIONS

International Search Report dated Nov. 10, 2015 in PCT/JP2015/073979 filed Aug. 26, 2015.

*Primary Examiner* — Eduardo Colon Santana
*Assistant Examiner* — Gabriel Agared
(74) *Attorney, Agent, or Firm* — Oblon, McClelland, Maier & Neustadt, L.L.P.

(57) ABSTRACT

To estimate a magnet magnetic flux or a magnet temperature with higher accuracy during a three-phase short circuit operation, than in a case only a d-axis current is used. A control device includes a phase short circuit unit for short-circuiting three-phase terminals of a permanent-magnet-type synchronous machine having a permanent magnet. During three-phase short circuit operation in which the three-phase terminals are short-circuited by the phase short circuit unit and the permanent-magnet-type synchronous machine is operated, the control device estimates a magnet state of the permanent magnet on the basis of a d-axis current, a q-axis current and a magnetic characteristic.

10 Claims, 7 Drawing Sheets

(58) Field of Classification Search
USPC .................................................. 318/400.02
See application file for complete search history.

(56) References Cited

U.S. PATENT DOCUMENTS

| | | | | |
|---|---|---|---|---|
| 2011/0031907 A1* | 2/2011 | Takahashi | ............. | H02P 21/141 |
| | | | | 318/139 |
| 2011/0062908 A1* | 3/2011 | Kitanaka | ................. | H02P 27/08 |
| | | | | 318/400.22 |
| 2013/0169202 A1* | 7/2013 | Schulz | ................. | B60L 15/025 |
| | | | | 318/400.02 |
| 2014/0145660 A1* | 5/2014 | Shimada | ................. | H02P 6/183 |
| | | | | 318/400.33 |
| 2014/0292238 A1* | 10/2014 | Furukawa | ............... | B60L 3/003 |
| | | | | 318/400.02 |
| 2014/0333240 A1* | 11/2014 | Kobayashi | ............ | H02P 21/141 |
| | | | | 318/400.02 |
| 2014/0354204 A1 | 12/2014 | Tachibana et al. | | |

FOREIGN PATENT DOCUMENTS

| | | | |
|---|---|---|---|
| JP | 2006-280141 A | | 10/2006 |
| JP | 2006280141 A | * | 10/2006 |
| JP | 2010-200515 A | | 9/2010 |
| JP | 2010-268566 A | | 11/2010 |
| JP | 2014-7851 A | | 1/2014 |
| WO | 2013/108877 A1 | | 7/2013 |

\* cited by examiner

| PARAMETER | HIGH TEMPERATURE SIDE | LOW TEMPERATURE SIDE |
|---|---|---|
| p1 | −188350.2 | −187175.9 |
| p2 | −201161.1 | −187171.5 |
| p3 | 3325108 | 3265031 |
| p4 | −1270094 | −1268368 |
| p5 | −7084064 | −6972777 |
| q1 | 5362.512 | 5100.131 |
| q2 | −35798.01 | −34158.52 |
| q3 | 682.2378 | 1363.559 |
| q4 | 133437.8 | 126228.9 |
| m | −91.87234 | −94.63623 |
| s | 38.03945 | 39.29553 |

CONTROL DEVICE AND CONTROL METHOD

TECHNICAL FIELD

The present invention relates to a control device and a control method for a permanent-magnet-type synchronous machine.

BACKGROUND ART

When a high load operation is continued in a motor having a permanent magnet, it is important to protect the permanent magnet from being overheated by a rise in the temperature of the motor. When the temperature of the magnet excessively rises, the magnetic force of the permanent magnet irreversibly decreases, so that the magnetic force does not return to the original force even when the magnet temperature returns to normal temperature. Thus, a torque obtained from the synchronous machine when the same current is applied thereto, is decreased by an amount equivalent to an amount by which the magnetic force is decreased. In order to avoid such a situation, the permanent magnet needs to be protected from being overheated by a rise in the temperature of the motor.

Methods for protecting the permanent magnet from being overheated are roughly classified into: a method in which designing is performed with an allowance provided in advance to beat radiation such that the permanent magnet is not overheated even in any operating state; and a method in which the magnet temperature is detected, and during heating, operation is controlled by reducing an operation load or activating a cooler.

Furthermore, methods for detecting the magnet temperature in the method in which operation is controlled, are roughly classified into: a method in which a temperature sensor or a sensor for detecting a magnetic flux which changes in response to the magnet temperature is additionally installed for detecting the magnet temperature; and a method in which the magnet temperature is estimated from a current, a voltage, or the like during operation of the motor.

In addition, examples of operation in which the magnet temperature easily rises in the method in which the magnet temperature is estimated from a current, a voltage, or the like during operation of the motor, include not only a state where the motor is rotated at a high speed with a large torque by a high current, but also a state where three-phase short circuit operation of the motor is performed. Here, the three-phase short circuit operation is operation in which three-phase terminals of the motor is virtually short-circuited.

As a conventional method for estimating the magnet temperature during the three-phase short circuit operation, a method is known in which a current detection value in a three-phase short circuit state is converted to values of a d-axis coordinate and a q-axis coordinate, an induced voltage constant is obtained from a predetermined d-axis inductance and the d-axis current resulting from the conversion, and the induced voltage constant is converted to a magnet temperature (for example, see Patent Document 1).

For reference, as a method for estimating the magnet temperature in a state other than the three-phase short circuit operation, there are the following two methods.

In the first methods the magnet temperature is estimated on the basis on information about how the ratio of a magnetic flux fundamental and harmonics change as compared to that at a reference time (for example, see Patent Document 2).

In the second method, the magnet magnetic flux or the magnet temperature is estimated from the difference between an actual voltage and a voltage calculated from a motor model held within a controller (for example, see Patent Document 3 and Patent Document 4).

CITATION LIST

Patent Document

Patent Document 1: Japanese Laid-open Patent Publication No. 2006-280141
Patent Document 2: Japanese Laid-Open Patent Publication No. 2014-007851
Patent Document 3: Japanese Laid-open Patent Publication No. 2001-186800
Patent Document 4: Japanese Laid-Open Patent Publication No. 2005-192325

SUMMARY OF THE INVENTION

Problems to be Solved by the Invention

For protecting the permanent magnet from being overheated, in the method in which designing is performed with an allowance provided in advance to heat radiation such that the permanent magnet is not overheated even in any operating state, the capacities of the motor and a heat radiator have to be increased, so that there is a problem in that it is difficult to reduce the size and the weight of the motor which is a permanent-magnet-type synchronous machine.

In the case where a temperature sensor (or a sensor for detecting a magnetic flux which chancres in response to the magnet temperature) is installed for detecting the magnet temperature, a space corresponding to the sensor to be installed is required, and the installation location is limited, so that there is a problem that it is difficult to reduce the size and the weight of a control device or the motor which is a permanent-magnet-type synchronous machine.

In the conventional control device disclosed in Patent Document 1, only the d-axis current is used as a current value to fee used for estimating the magnet temperature during the three-phase short circuit operation. However, when a rotation speed is low, a q-axis current flows, so that there is a problem that the accuracy of estimation of an induced voltage is low.

In the first method disclosed in Patent Document 2 in which the magnet temperature is estimated in a state other than the three-phase short circuit operation, it is difficult to distinguish between a magnetic flux harmonic caused by a current harmonic and a magnetic flux harmonic caused by a magnet temperature change, so that there is a problem that the accuracy of estimation of the magnet temperature is low.

In the second method disclosed in Patent Document 3 in which the magnet temperature is estimated in a state other than the three-phase short circuit operation, an estimated value is uniquely determined by assuming that the magnet temperature is equal to a winding temperature. However, as a matter of fact, the magnet temperature and the winding temperature are generally different from each other.

In the second method disclosed in Patent Document 4 in which the magnet temperature is estimated in a state other than the three-phase short circuit operation, an estimated value is uniquely determined by assuming a relationship in which the magnet temperature is α times off a winding temperature. However, a method for accurately determining the value of α is not described. Generally, the value of α changes moment by moment in response to the environmental temperature or the driving state of the motor. Thus, degradation of the accuracy of estimation occurs when the value of α is set in advance.

In each of Patent Document 3 and Patent Document 4, it is difficult to determine whether a shift off the voltage is due to a change in the magnet magnetic flux or the magnetic flux or due to a change in winding resistance caused by a change in the temperature of the winding, so that there is a problem that the accuracy off estimation of the magnet magnetic flux is low.

The present invention has been made to solve the above-described problems, and an object of the present invention is; to enable the size of a permanent-magnet-type synchronous machine or a control device to be reduced without needing a particular sensor such as a temperature sensor or a magnetic flux sensor; and to estimate a magnet magnetic flux or a magnet temperature during three-phase short-circuit operation with higher accuracy than in the case where only a d-axis current is used.

Solution to the Problems

A control device according to the present invention is a control device including a phase short circuit unit for short-circuiting three-phase terminals of a permanent-magnet-type synchronous machine having a permanent magnet, wherein, during three-phase short circuit operation in which the three-phase terminals are short-circuited by the phase short circuit unit and the permanent-magnet-type synchronous machine is operated, a magnet state of the permanent magnet is estimated on the basis of a d-axis characteristic and a q-axis characteristic.

In addition, a control method according to the present invention is a control method, wherein a processor executes: a three-phase short circuit step of short-circuiting three-phase terminals of a permanent-magnet-type synchronous machine having a permanent magnet during operation of the permanent-magnet-type synchronous machine; a detection step of detecting a d-axis characteristic and a q-axis characteristic of the permanent-magnet-type synchronous machine when the three-phase terminals are short-circuited in the three-phase short circuit step; and a magnet state estimation step of estimating a magnet state of the permanent magnet on the basis of the d-axis characteristic and the q-axis characteristic detected in the detection step.

Effect of the Invention

The control device and the control method configured as described above enables the size of the permanent-magnet-type synchronous machine or the control device to be reduced without needing a particular temperature sensor or the like during the three-phase short circuit operation, and also enables the magnet magnetic flux or the magnet temperature to be estimated with higher accuracy than in the case only a d-axis current is used.

BRIEF DESCRIPTION OP THE DRAWINGS

DESCRIPTION OF EMBODIMENTS

Embodiment 1

Figure 1:
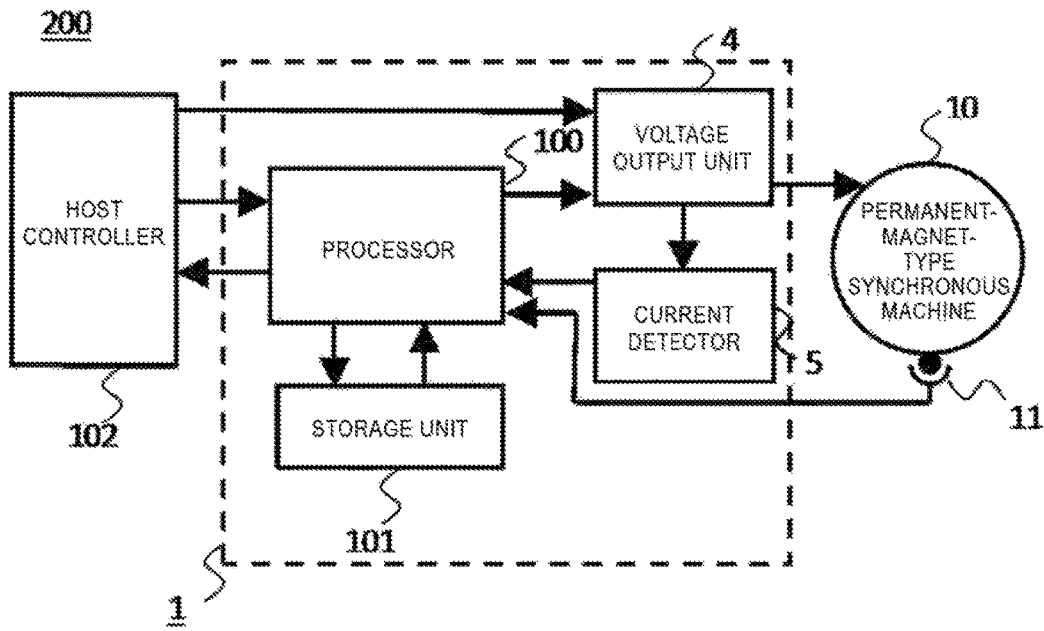
FIG. 1 is a diagram showing the hardware configuration of a synchronous machine system including a control device according to Embodiment 1 of the present Invention.

FIG. 1 is a diagram showing the hardware configuration of a synchronous machine system including a control device according to Embodiment 1 for carrying out the present invention.

In FIG. 1, a synchronous machine system 200 includes a host controller 102, a control device 1, a permanent-magnet-type synchronous machine 10, and a rotation angle detector 11.

The control device 1 includes, as hardware, a processor 100, a storage unit 101, a voltage output unit 4, and a current detector 5.

Although not shown, the storage unit 101 includes: a volatile storage unit such as a random access memory; and a nonvolatile auxiliary storage unit such as a flash memory. In addition, although not shown, the storage unit 101 may include: a volatile storage unit such as a random access memory; and an auxiliary storage unit such as a hard disk instead of a nonvolatile auxiliary storage unit.

The processor 100 executes a program inputted from the storage unit 101. Since the storage unit 101 includes the auxiliary storage unit and the volatile storage unit, the program is inputted from the auxiliary storage unit through the volatile storage unit to the processor 100. In addition, the processor 100 may output data such as a calculation result to the volatile storage unit of the storage unit 101, or may store the data in the auxiliary storage unit through the volatile storage unit.

Input and output between the hardware components in FIG. 1 will be described later.

Figure 2:
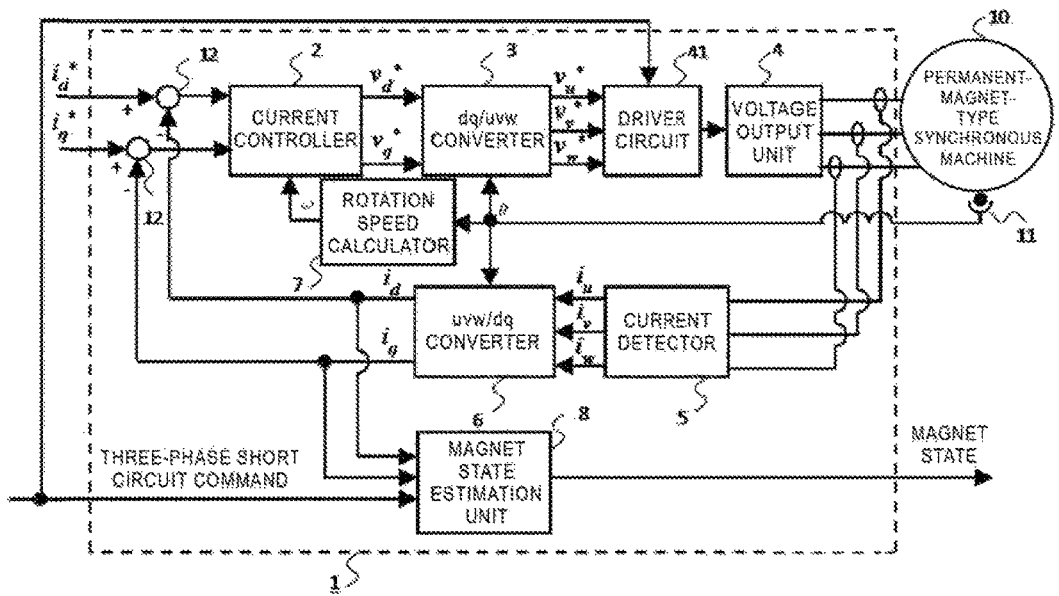
FIG. 2 is a diagram showing the entire configuration of a permanent-magnet-type synchronous machine and the control device according to Embodiment 1 of the present invention.

FIG. 2 is a diagram showing the entire configuration of the permanent-magnet-type synchronous machine and the control device according to Embodiment 1 for carrying out the present invention. The configuration of the control device 1 according to the present embodiment will be described with reference to FIG. 2. The control device 1 includes a current controller 2, a dq/uvw converter 3, the voltage output unit 4, the current detector 5, an uvw/dq converter 6, at rotation speed calculator 7, a magnet state estimation unit 8, adders/subtractors 12, and a driver circuit 41. The control device 1: receives input of a d-axis current command id*, a q-axis current command iq*, and a three-phase short circuit command from the host controller 102 which is not shown, and a rotation angle θ acquired from the rotation angle detector 11 which is installed at the permanent-magnet-type synchronous machine 10; and outputs a magnet state and voltages which are to be inputted to the permanent-magnet-type synchronous machine 10 and correspond to three-phase voltage commands. The control device 1 may receive input of a torque command or the like from the host controller 102. In this case, the control device 1 converts the torque command or the like to the d-axis current command id* and the q-axis current command iq*.

Although not shown, the permanent-magnet-type synchronous machine 10 includes: a stator having windings through which three-phase currents generated by the voltages corresponding to the three-phase voltage commands flow; and a rotor having different magnetic poles which are formed by a permanent magnet and arranged alternately in the circumferential direction with respect to a rotation shaft. The rotation angle detector 11 is installed at the rotor of the permanent-magnet-type synchronous machine 10 and detects the rotation angle θ of the rotor.

The current controller 2 receives: values obtained by subtracting a d-axis current id and a q-axis current iq, which are provided by a device outside the control device 1 (e.g., the host controller 102 which is not shown), from the d-axis current command id* and the q-axis current command iq*, respectively, by the adders/subtractors 12; and a rotation speed ω of the rotor of the permanent-magnet-type synchronous machine 10. Then, upon reception of these inputs, the current controller 2 outputs a d-axis voltage command vd* and a q-axis voltage command vq*. The d-axis voltage command vd* and the q-axis voltage command vq* are set to values with which the d-axis current id and the q-axis current iq flowing through the permanent-magnet-type synchronous machine 10 are caused to follow the d-axis current command id* and the q-axis current command iq*.

The dq/uvw converter 3 converts the d-axis voltage command vd* and the q-axis voltage command vq* to three-phase voltage commands vu*, w*, and w* on the basis of θ indicating the circumferential direction of the rotor of the permanent-magnet-type synchronous machine 10, by using a well-known coordinate conversion method.

The driver circuit 41 receives the three-phase voltage commands vu*, vv*, and vw* or the three-phase short circuit command and sands switching signals for driving later-described switching elements, to the voltage output unit 4.

Upon reception of the switching signals, the voltage output unit 4 outputs voltages corresponding to the three-phase voltage commands vu*, vv*, and vw*. Upon reception of the three-phase short circuit command from the host controller 102, the voltage output unit 4 short-circuits three-phase terminals of the permanent-magnet-type synchronous machine 10 by making the later-described switching elements of the voltage output unit 4 conductive.

The current detector 5 is, for example, a current sensor such as a resistance which is installed on a wire which connects the voltage output unit 4 to the permanent-magnet-type synchronous machine 10. The current detector 5 detects three-phase currents iu, iv, and iw flowing from the voltage output unit 4 to the permanent-magnet-type synchronous machine 10.

The uvw/dq converter 6 converts the three-phase currents iu, iv, and iw detected by the current detector 5 to the d-axis current id and the q-axis current iq by using a well-known coordinate conversion method.

The rotation speed calculator 7 outputs the rotation speed ω of the rotor of the permanent-magnet-type synchronous machine 10 on the basis of the rotation angle θ of the rotor acquired from the rotation angle detector 11 which is installed at the permanent-magnet-type synchronous machine 10.

When the magnet state estimation unit 8 receives the three-phase short circuit command, the magnet state estimation unit 8 estimates the magnet state of the permanent-magnet-type synchronous machine 10 on the basis of the d-axis current id and the c-axis current iq acquired from the uvw/dq converter 6.

Here, the magnet state refers to the magnet temperature or the magnet magnetic flux of the permanent magnet. In addition, the magnet state includes an induced voltage constant or a torque constant which is substantially equivalent to the magnet magnetic flux.

The current controller 2, the dq/uvw converter 3, the uvw/dq converter 41, the rotation speed calculator 7, the magnet state estimation unit 8, the adders/subtractors 12, and the driver circuit 41 in FIG. 2 are implemented by the processor 100 which executes a program stored in the storage unit 101 or by a processing circuit such as a system LSI which is not shown. In addition, the above functions may foe executed by cooperation of a plurality of processors 100 and a plurality of storage units 101, or may be executed by cooperation of a plurality of processing circuits. Moreover, the above functions may be executed by cooperation of a combination of: a plurality of processors 100 and a plurality of storage units 101; and a plurality of processing circuits.

Figure 3:
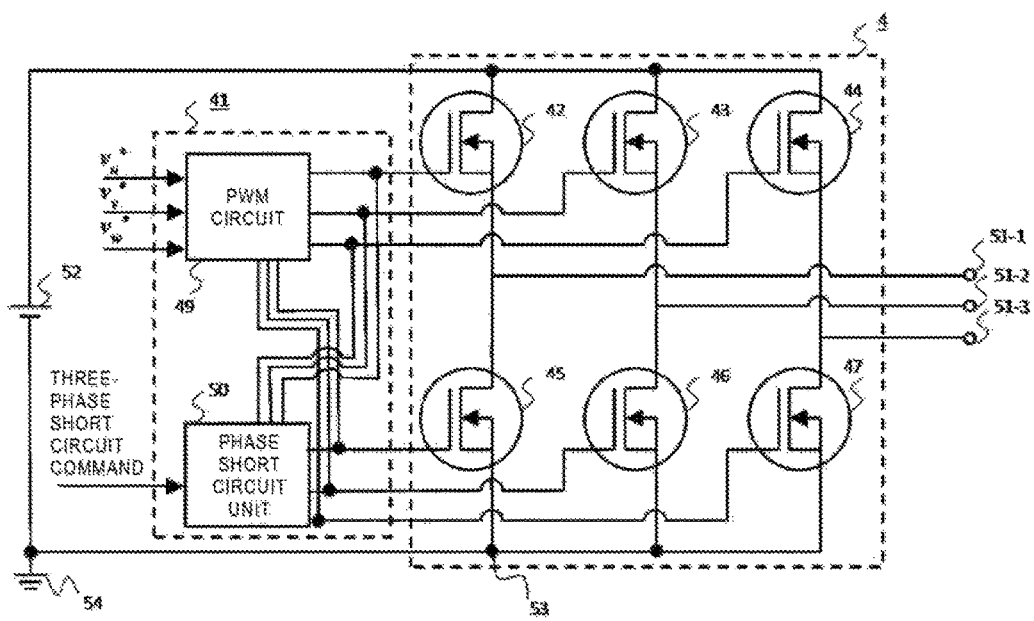
FIG. 3 is a diagram showing the configurations of a voltage output unit and a driver circuit in the control device according to Embodiment 1 of the present invention.

FIG. 3 is a diagram showing the configurations of the voltage output unit and the driver circuit in the control device according to the present embodiment. FIG. 3 shows a specific configuration example of the voltage output unit of the present embodiment. The voltage output unit 4 is supplied with DC power from a power supply 52 such as a battery. As shown in FIG. 3, the voltage output unit 4 includes a three-phase bridge circuit having six switching elements 42 to 47. The driver circuit 41 sends the switching signals for driving the switching elements 42 to 47.

The three-phase bridge circuit of the voltage output unit 4 is composed of a bridge in which the six switching elements 42 to 47 such as MOSFETs are used. In the three-phase bridge circuit, the switching elements 42 and 45 are connected in series, the switching elements 43 and 46 are connected in series, the switching elements 44 and 47 are connected in series, and further these three pairs of the switching elements are connected in parallel.

In addition, although not shown, one shunt resistor may be connected as the current detector 5 at each of GND 54 (ground) sides of the three switching elements 45, 46, and 47 at the lower side. These shunt resistors are used for detecting the three-phase currents iu, iv, and iw flowing from the voltage output unit 4 to the permanent-magnet-type synchronous machine 10. Although the example is shown in which the number of the shunt resistors is three, two shunt resistor may be provided, or the current detection is possible even with one shunt resistor, and such a configuration may be provided.

However, even in the case where one shunt resistor is used as the current detector 5, unlike a normal so-called one-shunt method, the one shunt resistor is not provided between the GND 54 and a connection portion 53 to which the GND 54 sides of the switching elements 45, 46, and 47 are electrically connected. This is because one shunt resistor provided at such a position cannot detect a current during three-phase short circuit. Thus, even in the case where one shunt resistor is used, the shunt resistor needs to be provided between any of the GND 54 sides of the switching elements 45, 46, and 47 and the connection portion 53.

In addition, in the case where one shunt resistor is used as the current detector 5, although not shown, the current detector 5 detects a current phase by a PLL, which is a phase synchronous circuit, or the like, and estimates three-phase currents on the basis of the assumption that the three-phase currents are generally balanced.

The three-phase currents iu, iv, and iw respectively flow from between the switching element 42 and the switching element 45 through a bus bar or the like to a U-phase terminal 51-1 of the permanent-magnet-type synchronous machine 10, from between the switching element 43 and the switching element 46 through a bus bar or the like to a V-phase terminal 51-2 of the permanent-magnet-type synchronous machine 10, and from between the switching element 44 and the switching element 47 through a bus bar or the like to a W-phase terminal 51-3 of the permanent-magnet-type synchronous machine 10, to be supplied to the permanent-magnet-type synchronous machine 10.

One current transformer or the like may be connected to each of these bus bars. These current transformers or the like are used for detecting the three-phase currents iu, iv, and iw flowing from the voltage output unit 4 to the permanent-magnet-type synchronous machine 10. As a most preferable embodiment, FIG. 2 shows the current detector 5 including three current transformers and a peripheral amplifier circuit.

The number of the current transformers may be two. In this case, the current detector 5 can obtain a current value of the remaining one phase by using the fact that the sum of the three-phase currents is zero.

Moreover, the number of the current transformers may be one. In this case, similarly to the above description, the current detector 5 can obtain the three-phase currents on the basis of current phase detection and the assumption that the three-phase currents are generally balanced.

Alternatively, in terms of cost, instead of the current transformers, shunt resistors may be connected in series with the bus bars or the like.

The driver circuit 41 has a PWM circuit 49 and a phase short circuit unit 50.

The PWM circuit 49 sends, to the switching elements 42 to 47, switching signals composed of waveforms for switching the switching elements 42 to 47 in accordance with the voltages corresponding to the three-phase voltage commands vu*, w*, and vw*.

When the phase short circuit unit 50 receives the three-phase short circuit command from the host controller 102 which is not shown, the phase short circuit unit 50 sends, to the switching elements 42 to 47, a three-phase short circuit switching signal for making only a specific group among the switching elements 42 to 47 conductive. The three-phase short circuit switching signal includes a three-phase short circuit switching signal based on upper-arm conduction and a three-phase short circuit switching signal based on lower-arm conduction. The three-phase short circuit switching signal based on upper-arm conduction refers to a signal for making the switching elements 42 to 44 conductive and not making the switching elements 45 to 47 conductive. The three-phase short circuit switching signal based on lower-arm conduction refers to a signal for making the switching elements 45 to 47 conductive and not making the switching elements 42 to 44 conductive.

In the case where shunt resistors placed at the GND 54 sides of the switching elements 45, 46, and 47 are used as the current detector 5, it is necessary to always output the three-phase short circuit switching signal based on lower-arm conduction.

In the case where the current detector 5 is configured with current transformers or the like connected to the above-described bus bars or the like, any of upper-arm conduction and lower-arm conduction is allowable.

By either the switching elements 42 to 44 or the switching elements 45 to 47, which have received the three-phase short circuit switching signal, being made conductive, the u-phase terminal 51-1, the V-phase terminal 51-2, and the W-phase terminal 51-3, which are the three-phase terminals of the permanent-magnet-type synchronous machine 10, are short-circuited. That is, the phase short circuit unit 50 short-circuits the U-phase terminal 51-1, the v-phase terminal 51-2, and the W-phase terminal 51-3, which are the three-phase terminals of the permanent-magnet-type synchronous machine 10.

The magnet state estimation unit 8 calculates a magnet magnetic flux estimated value ΦPM of the magnet magnetic flux as the magnet state on the basis of the following mathematical expression by using: the d-axis current id and the q-axis current iq acquired from the uvw/dq converter 6; and a d-axis inductance Ld and a q-axis inductance Lq which are preset.

[Mathematical 1]

$$\Phi_{PM} = -\frac{L_d i_d^2 + L_q i_q^2}{i_d} \quad (1)$$

Figure 4:
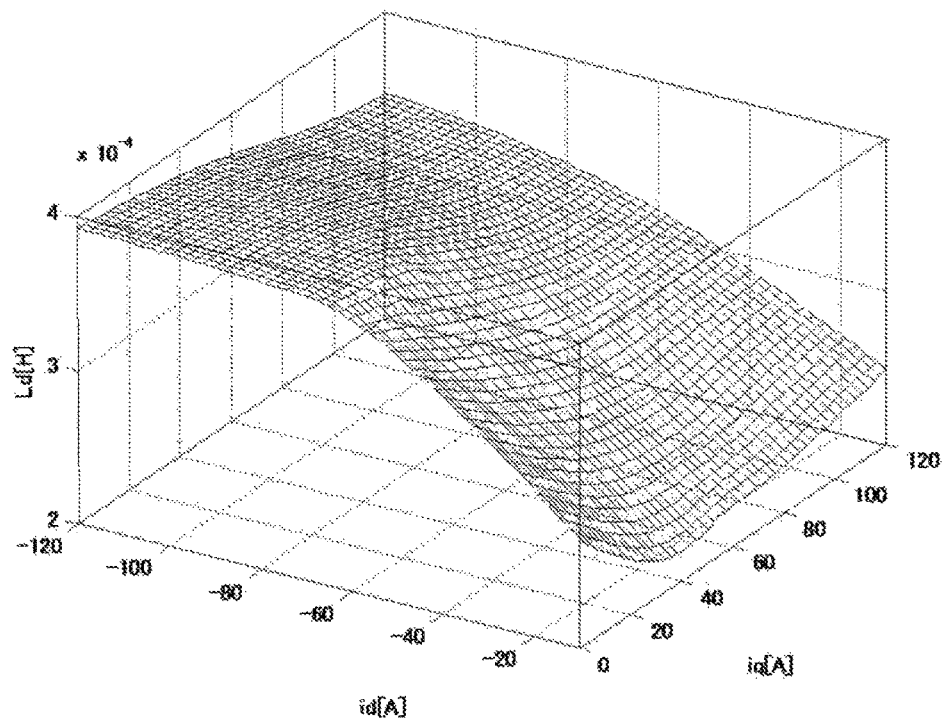
FIG. 4 is a diagram showing a setting example of a d-axis inductances Ld to be used in the control device according to Embodiment 1 of the present invention.
Figure 5:
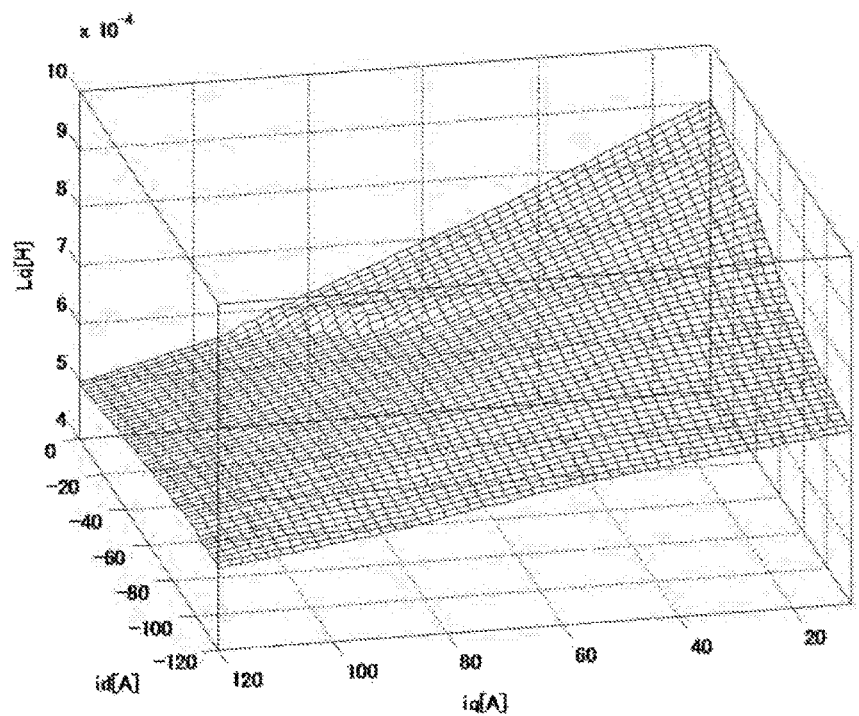
FIG. 5 is a diagram showing a setting example of a q-axis inductance Lq to be used in the control device according to Embodiment 1 of the present invention.

FIG. 4 is a diagram showing a setting example of the d-axis inductance Ld to be used in the control device according to the present embodiment. The horizontal axis in FIG. 4 represents the d-axis current id, the vertical axis in FIG. 4 represents the q-axis current iq, and the height axis in FIG. 4 represents the d-axis inductance Ld. FIG. 5 is a diagram showing a setting example of the q-axis inductance Lq to be used in the control device of the present embodiment. The horizontal axis in FIG. 5 represents the d-axis current id, the vertical axis in FIG. 5 represents the q-axis current iq, and the height axis in FIG. 5 represents the q-axis inductance Lq. The d-axis inductance Ld and the q-axis inductance Lq, which are preset, may not be fixed values but may be set as maps corresponding to the d-axis current id and the q-axis current iq as shown in FIGS. 4 and 5. These set values are different depending on the permanent-magnet-type synchronous machine 10 which is a driving target of the control device 1.

In addition, in a calculation method that is an alternative to expression (1), the magnet state estimation unit 8 may directly use a d-axis magnetic flux Φd and a q-axis magnetic flux Φq without explicitly using the d-axis inductance Ld and the q-axis inductance Lq. Specifically, the magnet state estimation unit 8 may obtain the d-axis magnetic flux Φd and the q-axis magnetic flux Φq from the d-axis current id and the q-axis current iq with maps, and may calculate the magnet magnetic flux estimated value ΦPM on the basis of the following mathematical expression.

[Mathematical 2]

$$\Phi_{PM} = -\frac{\phi_d i_d + \phi_q i_q}{i_d} \quad (2)$$

Furthermore, a method in which, in addition to the calculation of expression (2), the magnet state estimation unit 8 calculates a magnet temperature estimated value TPM from the magnet magnetic flux estimated value ΦPM calculated therein, will be described below.

Figure 6:
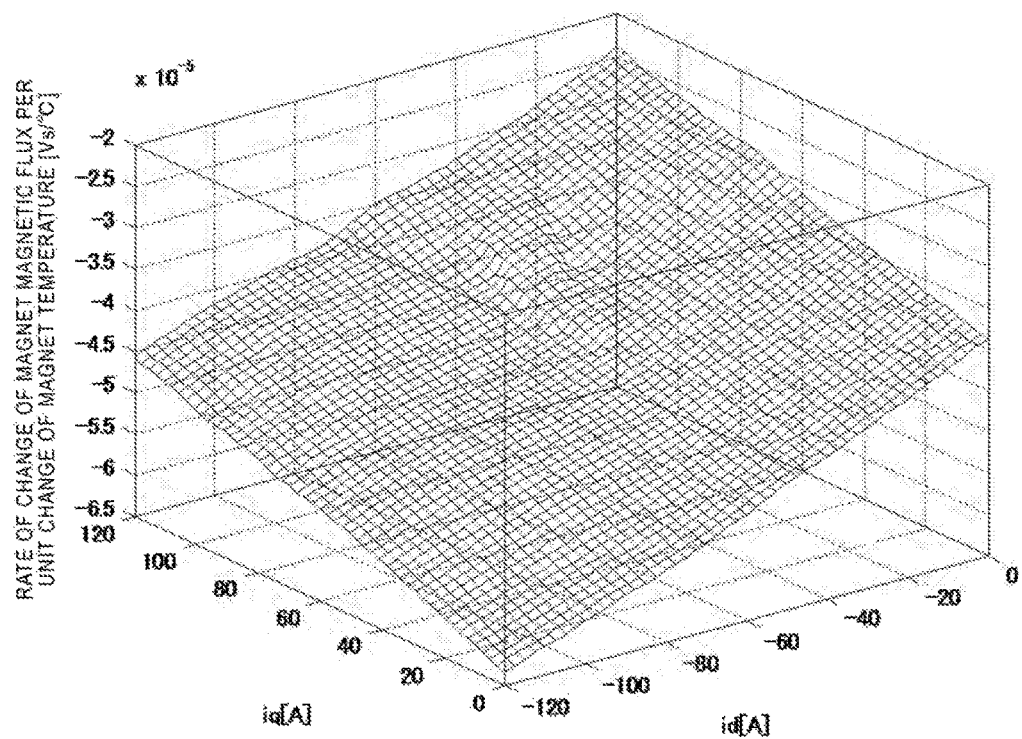
FIG. 6 is a diagram showing a setting example of a rate of change of a magnet magnetic flux per unit change of a magnet temperature which is to be used in the control device according to Embodiment 1 of the present invention.

FIG. 6 is a diagram showing a setting example of a rate of change of the magnet magnetic flux per unit change of the magnet temperature which is to be used in the control device of the present embodiment. The horizontal axis in FIG. 6 represents the d-axis current id, the vertical axis in FIG. 6 represents the q-axis current iq, and the height axis in FIG. 6 represents the rate of change of the magnet magnetic flux per unit change of the magnet temperature. The magnet state estimation unit 8 calculates the magnet temperature estimated value TPM of the magnet temperature as the magnet state from the magnet magnetic flux estimated value ΦPM, which is calculated by expression (2), further on the basis of the following mathematical expression.

[Mathematical 3]

$$T_{PM} = T_{PM0} + \frac{\Phi_{PM} - \Phi_{PM0}}{k} \quad (3)$$

Here, ΦPM0 indicates a preset reference magnet magnetic flux and is a value corresponding to the magnet magnetic flux at a reference magnet temperature TPM0 and k indicates the rate of change of the magnet magnetic flux per unit change of the magnet temperature and is a preset value. However, k does not need to be set as a fixed value and may be set as a map corresponding to the d-axis current id and the q-axis current iq as shown in FIG. 6. The set value of k is different depending on the permanent-magnet-type synchronous machine 10 which is a driving target of the control device 1.

Figure 7:
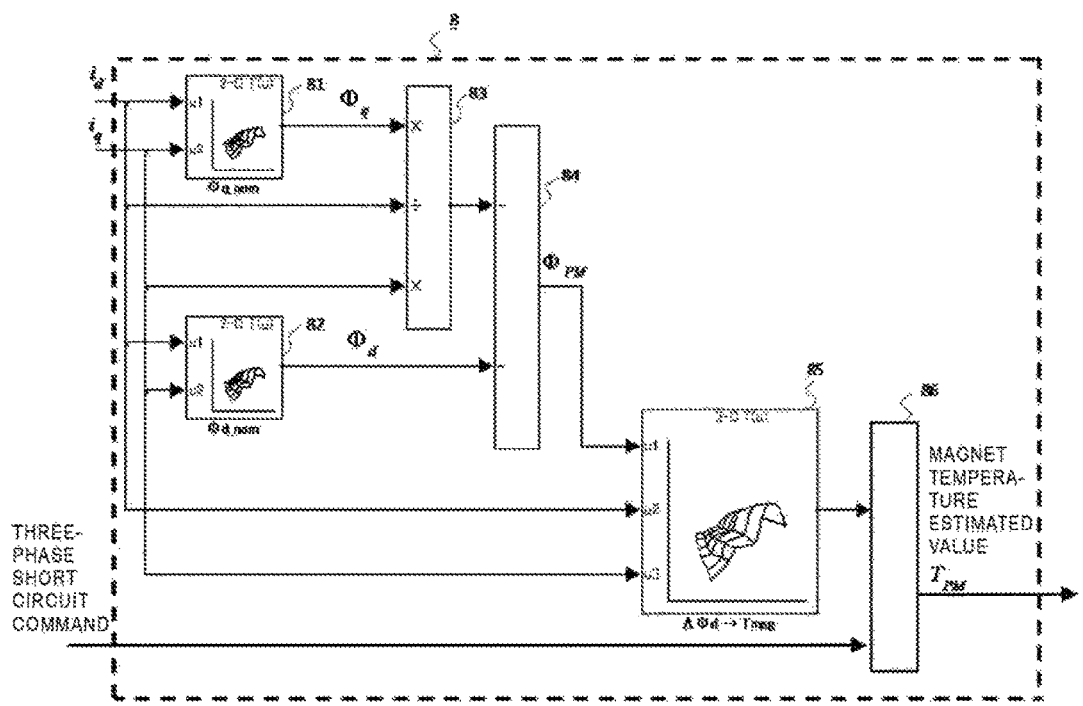
FIG. 7 is a diagram showing the configuration of a magnet state estimation unit in the control device according to Embodiment 1 of the present invention.

FIG. 7 is a diagram showing the configuration of the magnet state estimation unit in the control device according to the present embodiment. Instead of obtaining k with the map and calculating the magnet temperature estimated value TPM on the basis of expression (3), the magnet temperature estimated value TPM can also be directly obtained on the basis of the magnet magnetic flux estimated value ΦPM, which is obtained on the basis of expression (1) and expression (2), the d-axis current id, and the q-axis current iq as shown in the magnet state estimation unit 8 in FIG. 7.

An operation of magnet temperature estimation by the magnet state estimation unit 8 in FIG. 7 will be described. In FIG. 7, a q-axis magnetic flux map 81 obtains the q-axis magnetic flux Φq from the d-axis current id and the q-axis current iq. A d-axis magnetic flux map 82 obtains the d-axis magnetic flux Φd from the d-axis current id and the q-axis current iq. A multiplier/divider 83 divides the q-axis magnetic flux Φq by the d-axis current id and multiplies the resultant value by the q-axis current iq. A subtractor 84 sums up a value obtained by inverting the sign of the output value of the multiplier/divider 83 and a value obtained by inverting the sign of the output value of the d-axis magnetic flux map 82. The output value of the subtractor 84 is equivalent to the magnet magnetic flux estimated value ΦPM shown in expression (2).

In a temperature estimation map 85, the magnet temperature estimated value TPM is obtained from the d-axis current id, the q-axis current iq, and the magnet magnetic flux estimated value ΦPM, which is the output value of the subtractor 84. The temperature estimation map 85 corresponds to expression (3). Meanwhile, since k and ΦPM0 in expression (3) slightly change in accordance with the d-axis current id and the q-axis current iq in some cases, the temperature estimation map 85 is implemented as a map in consideration of these changes.

A switch 86 outputs the magnet temperature estimated value TPM only when the three-phase short circuit command is valid.

Figure 8:
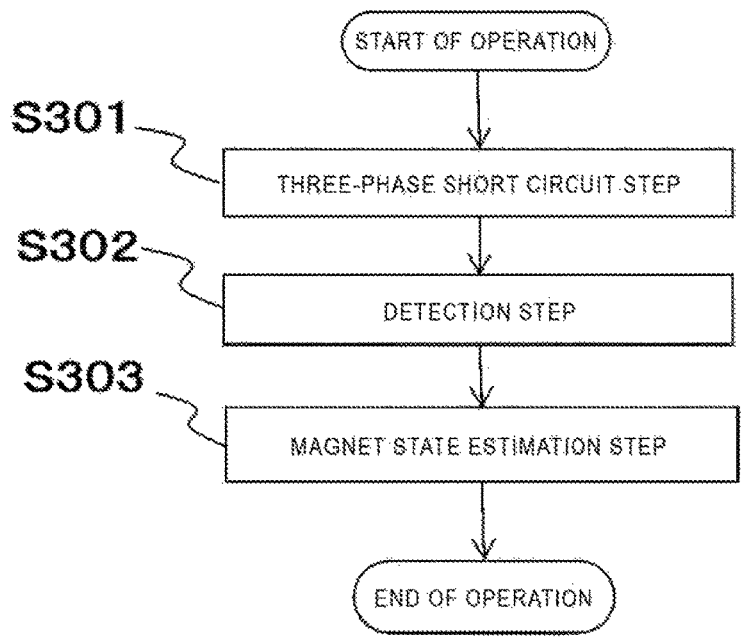
FIG. 8 is a flowchart of a control method according to Embodiment 1 of the present invention.

FIG. 8 is a flowchart of a control method according to the present embodiment. In FIG. 8, in the control method according to the present embodiment, in a period after operation of the permanent-magnet-type synchronous machine 10 is started until the operation of the permanent-magnet-type synchronous machine 10 ends, the processor 100 sequentially executes a three-phase short circuit step S301, a detection step S302, and a magnet state estimation step S303.

First, in the three-phase short circuit step S301, the U-phase terminal 51-1, the V-phase terminal 51-2, and the W-phase terminal 51-3, which are the three-phase terminals of the permanent-magnet-type synchronous machine 10, are short-circuited.

Next, in the detection step S302, the d-axis current id and the q-axis current iq are detected as a d-axis characteristic and a q-axis characteristic of the permanent-magnet-type synchronous machine 10.

Finally, in the magnet state estimation step S303, the magnet magnetic flux estimated value ΦPM of the magnet magnetic flux is estimated as the magnet state of the permanent magnet by using expression (1) or expression (2) on the basis of: the d-axis current id which is the d-axis characteristic detected in the detection step S302; and the q-axis current iq which is the q-axis characteristic detected in the detection step S302. In addition, the magnet temperature estimated value TPM of the magnet temperature is estimated as the magnet state of the permanent magnet by using expression (3), FIG. 6, or FIG. 7 on the basis of the d-axis current id and the q-axis current iq which are detected in the detection step S302.

Therefore, during three-phase short circuit operation in which the three-phase terminals 51-1 to 51-3 are short-circuited by the phase short circuit unit 50 and the permanent-magnet-type synchronous machine 10 is operated, the control device 1 according to the present embodiment calculates the magnet magnetic flux estimated value ΦPM of the magnet magnetic flux as the magnet state of the permanent magnet of the permanent-magnet-type synchronous machine 10 on the basis of the d-axis current id, the preset d-axis inductance Ld, the q-axis current iq, and the preset q-axis inductance Lq.

That is, during the three-phase short circuit operation, the control device 1 estimates the magnet state of the permanent magnet of the permanent-magnet-type synchronous machine 10 on the basis of: d-axis characteristics which are the d-axis current id and the preset d-axis inductance Ld; and q-axis characteristics which are the q-axis current iq and the preset q-axis inductance Lq.

With this configuration, it is made possible to reduce the size of the permanent-magnet-type synchronous machine or the control device without needing a particular temperature sensor or the like, and it is made possible to estimate the magnet magnetic flux more accurately even when the q-axis current iq flows, than in the case where only the d-axis current id is used. In addition, even with a size-reduced permanent-magnet-type synchronous machine for which heat radiation designing has less allowance, it is possible to protect the permanent magnet thereof from being overheated.

Generally, during a three-phase short circuit, when a winding resistance changes due to a rise in the temperature of the winding of a permanent-magnet-type synchronous machine, the d-axis current also changes. Thus, in the case where only the d-axis current is used, it is normally difficult to determine whether the d-axis current changes due to a change in the magnet temperature or dye to a change in the winding resistance. This is made possible when a change in the d-axis current due to a change in the winding-resistance is sufficiently small. Specifically, this is made possible only during rotation at a high rotation speed (which depends on the characteristics of the permanent-magnet-type synchronous machine, but is equal to or greater than about 2000 rpm in the case of a permanent-magnet-type synchronous machine used in an experiment).

Meanwhile, as in the configuration of the present embodiment, by also using the q-axis current, it is made possible to distinguish between a current change due to a change in the winding resistance and a current change due to a change in the magnet state and estimate the magnet state more accurately at a low rotation speed (which depends on the characteristics of the permanent-magnet-type synchronous machine, but is equal to or greater than about 300 rpm in the case of the permanent-magnet-type synchronous machine used in the experiment) than in the case where the d-axis current is used.

Incidentally, in the case of performing a braking operation in order to stop rotation of a motor, the motor is driven such that a torque in a direction opposite to the rotation direction is generated. When the rotation speed is decreased to a certain speed or lower, a torque for braking is generated by short-circuiting three phases of the motor in some cases. At such a time, the control device 1 according to the present embodiment can achieve sufficient accuracy of estimation of the magnet state even at a low rotation speed at which a braking torque is generated by a three-phase short circuit.

Or, in the case of generating power by connection to a power source, for example, as in an alternator for an automobile, the rotation speed of the synchronous machine during operation is normally determined from the rotation speed of the power source (e.g., the rotation speed of an engine corresponding to the vehicle speed). At such a time, overheating of the permanent magnet may foe caused even at an intermediate rotation speed (e.g., 1000 rpm), and thus it is necessary to continue to estimate the magnet state.

In the case of estimation only with the d-axis current, sufficient accuracy of estimation of the magnet state is not achieved at the intermediate rotation speed, so that there is a drawback that the magnet state cannot be estimated in such an operating state. Thus, it is necessary to design heat radiation such that the permanent magnet is not overheated at the intermediate rotation speed, so that there is a drawback that the size of the permanent-magnet-type synchronous machine increases, for example.

Even at the intermediate rotation speed, the control device 1 according to the present embodiment can achieve sufficient accuracy of estimation of the magnet state. Since the accuracy of estimation of the magnet state improves, heat radiation designing can have allowance, so that there is an advantage that the size of the permanent-magnet-type synchronous machine can be reduced, for example.

In addition, during the three-phase short circuit operation, the control device 1 according to the present embodiment calculates the magnet magnetic flux estimated value ΦPM of the magnet magnetic flux as the magnet state of the permanent magnet of the permanent-magnet-type synchronous machine 10 on the basis of the d-axis current id, the d-axis magnetic flux Φd, the q-axis current iq, and the q-axis magnetic flux Φq.

That is, during the three-phase short circuit operation, the control device 1 estimates the magnet state of the permanent magnet of the permanent-magnet-type synchronous machine 10 on the basis of: the d-axis characteristics which are the d-axis current id and the d-axis magnetic flux Φd; and the q-axis characteristics which are the q-axis current iq and the q-axis magnetic flux Φq.

Also with this configuration, the same advantageous effect is achieved as in the above-described case where the magnet magnetic flux estimated value ΦPM is estimated on the basis of the preset d-axis inductance Ld and the preset q-axis inductance Lq.

In addition, by explicitly using the magnet magnetic flux as in expression (2), changes in the d-axis inductance Ld and the q-axis inductance Lq due to magnetic saturation can be taken into consideration. Thus, even when high current flows, it is possible to accurately estimate the magnet magnetic flux.

During the three-phase short circuit operation, the control device 1 according to the present embodiment further calculates the magnet temperature estimated value TPM of the magnet temperature as the magnet state of the permanent magnet of the permanent-magnet-type synchronous machine 10 on the basis of the magnet magnetic flux estimated value ΦPM by using: the preset reference magnet temperature TPM0; the reference magnet magnetic flux ΦPM0 which is preset at the reference magnet temperature TPM0; and the preset rate of change k of the magnet magnetic flux per unit change of the magnet temperature.

With this configuration, it is made possible to reduce the size of the permanent-magnet-type synchronous machine or the control device without needing a particular temperature sensor or the like, and it is made possible to estimate not only the magnet magnetic flux but also the magnet temperature more accurately even when the q-axis current iq flows, than in the case where only the d-axis current id is used. In addition, even with a size-reduced permanent-magnet-type synchronous machine for which heat radiation designing has a less allowance, it is possible to protect the permanent magnet thereof from being overheated.

Even when the magnitude of an applied current is the same, the torque or the power generation amount of the permanent-magnet-type synchronous machine 10 varies in response to the magnet temperature. It is possible to correct the variation of the torque or the power generation amount with the magnet temperature estimated value TPM.

During the three-phase short circuit operation, the control device 1 according to the present embodiment further calculates the magnet temperature estimated value TPM of the magnet temperature as the magnet state of the permanent magnet of the permanent-magnet-type synchronous machine 10 on the basis of the d-axis current id, the q-axis current iq, and the magnet magnetic flux estimated value ΦPM by using the preset temperature estimation map 85.

Also with this configuration, the same advantageous effect is achieved as in the above-described case where the magnet temperature estimated value TPM is calculated on the basis of the magnet magnetic flux estimated value ΦPM by using: the preset reference magnet temperature TPM0; the reference magnet magnetic flux ΦPM0 which is preset at the reference magnet temperature TPM0; and the preset rate of change k of the magnet magnetic flux per unit change of the magnet temperature.

This configuration is required when the rate of change k of the magnet magnetic flux per unit change of the magnet temperature is not constant and the necessity to correct the rate of change k arises.

Also when the magnet temperature and the magnet magnetic flux are nonlinear with respect to the d-axis current id and the q-axis current iq, this can be taken into consideration by the temperature estimation map 85, so that the accuracy of the magnet temperature estimated value TPM improves.

Embodiment 2

Figure 9:
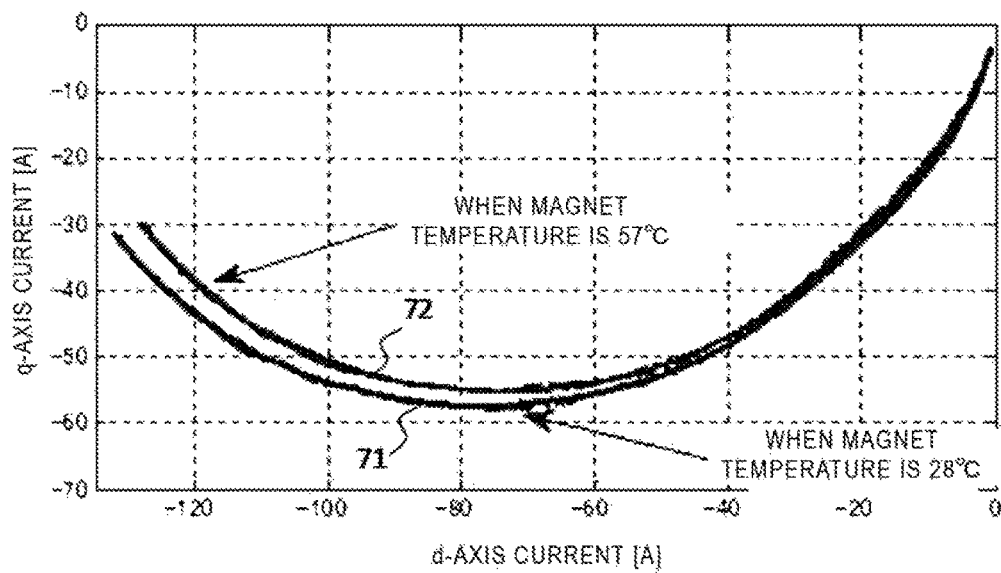
FIG. 9 is a diagram showing an example of three-phase short circuit current loci in a control device according to Embodiment 2 of the present invention.

FIG. 9 is a diagram showing an example of three-phase short circuit current loci in a control device according to Embodiment 2 for carrying out the present invention. The horizontal axis in FIG. 9 represents the d-axis current id, and the vertical axis in FIG. 5 represents the q-axis current iq. The control device 1 according to the present embodiment is different from Embodiment 1 in the following points. The magnet state estimation unit 8 in the present embodiment calculates the magnet state on the basis of a preset three-phase short circuit current locus and the d-axis current id and the q-axis current iq which are acquired from the uvw/dq converter 6.

Here, the three-phase short circuit current locus refers to the locus of the d-axis current id and the q-axis current iq which are drawn on a dq-axis coordinate plane when the rotor of the permanent-magnet-type synchronous machine 10 is externally rotated and the rotation speed is slowly changed in a state where the three-phase terminals 51-1 to 51-3 of the permanent-magnet-type synchronous machine 10, which is a driving target of the control device 1, are short-circuited. That is, the three-phase short circuit current locus refers to a curved line which is formed by steady-state values of the d-axis current id and the q-axis current iq which are different at each rotation speed. The three-phase short circuit current locus is different depending on a difference in the magnet state of the permanent-magnet-type-synchronous machine 10.

FIG. 9 shows, as an example of actually measured three-phase short circuit current loci, a three-phase short circuit current locus 71 in the ease where the magnet temperature is 28° C., and a three-phase short circuit current locus 72 in the case where the magnet temperature is 57° C. In a state where the three-phase terminals 51-1 to 51-3 of the permanent-magnet-type synchronous machine 10 are short-circuited, when the rotor of the permanent-magnet-type synchronous machine 10 is externally rotated, the absolute values of the d-axis current id and the q-axis current iq, which do not flow during rest, increase as the rotation speed of the rotor increases. FIG. 9 is obtained by plotting the d-axis current id and the q-axis current iq on the dq-axis coordinate plane when the rotation speed is changed.

As shown in FIG. 9, the absolute value of the q-axis current iq of the three-phase short circuit current-locus is lower than the absolute value of the q-axis current iq of the three-phase short circuit current locus 71 at the same d-axis current id, and the shapes of the three-phase short circuit current loci 71 and 72 are different from each other depending on the magnet temperature. This is because the magnet magnetic flux of the permanent magnet changes due to a change in the magnet temperature, and the voltage induced by rotation of the magnet magnetic flux also changes, so that the d-axis current id and the q-axis current iq become different from each other.

Figure 10:
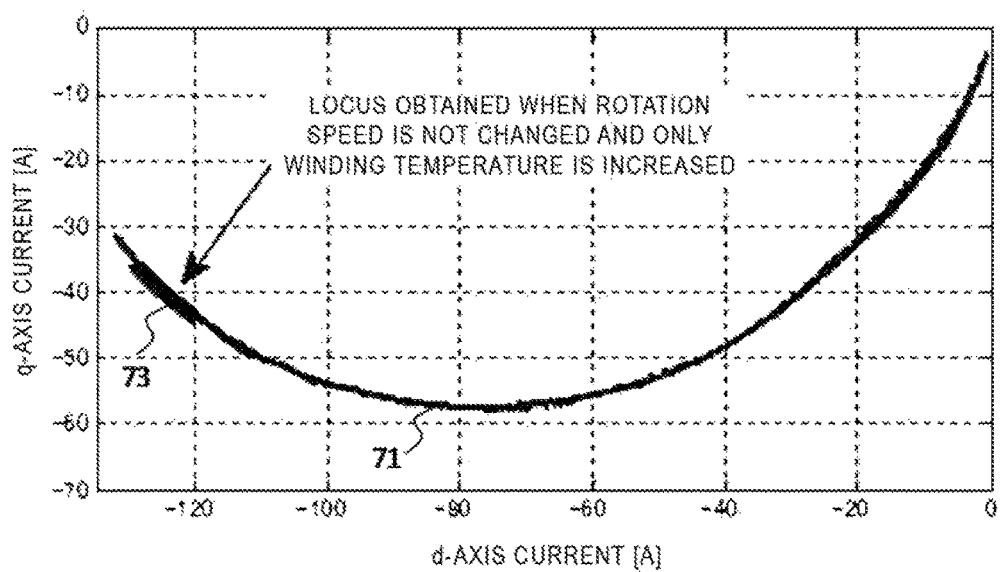
FIG. 10 is a diagram showing an example of three-phase short circuit current loci in the control device according to Embodiment 2 of the present invention.

FIG. 10 is a diagram showing an example of three-phase short circuit current loci in the control device according to the present embodiment. The horizontal axis in FIG. 10 represents the d-axis current id, and the vertical axis in FIG. 10 represents the q-axis current iq. In FIG. 10, the three-phase short circuit current locus 71 shown toy a thin line is one recorded at a magnet temperature of 28° C. while the rotation speed is changed. A three-phase short circuit current locus 73 shown by a thick line in FIG. 10 is one obtained by plotting the d-axis current id and the q-axis current iq when the winding resistance is gradually increased by increasing the temperature of the winding while the rotation speed is kept at a fixed speed of 700 [rpm]. In FIG. 10, the three-phase short circuit current loci 71 and 73 overlap each other.

The three-phase short circuit current locus 71 has a notable characteristic in that the shape of the three-phase short circuit current locus 71 does not change even when an electrical resistance such as the winding resistance of the permanent-magnet-type synchronous machine 10 changes. FIG. 10 is obtained by experimentally confirming this characteristic.

The three-phase short circuit current locus 71 in a state where the winding resistance has increased overlaps the three-phase short circuit current locus 71 in a state where the winding resistance is low. In further detail, points in the case of rotation at a higher rotation speed, on the three-phase short circuit current locus 71 in a state where the winding resistance has increased, overlap points in the case of rotation at a lower rotation speed, on the three-phase short circuit current locus 71 in a state where the winding resistance is low. Specifically, where the winding resistance is denoted by R and the rotation speed of the rotor is denoted by ω, points at which R÷ω is equal to each other, on the three-phase short circuit current locus 71, overlap each other.

Since the three-phase short circuit current loci 71 and 73 overlap each other in FIG. 10, this corroborates the fact that the shape of the three-phase short circuit current locus 71 does not change even when the winding resistance changes.

Next, the settings of three-phase short circuit current loci in the magnet state estimation unit 8 will be described.

Figures 11, 12:
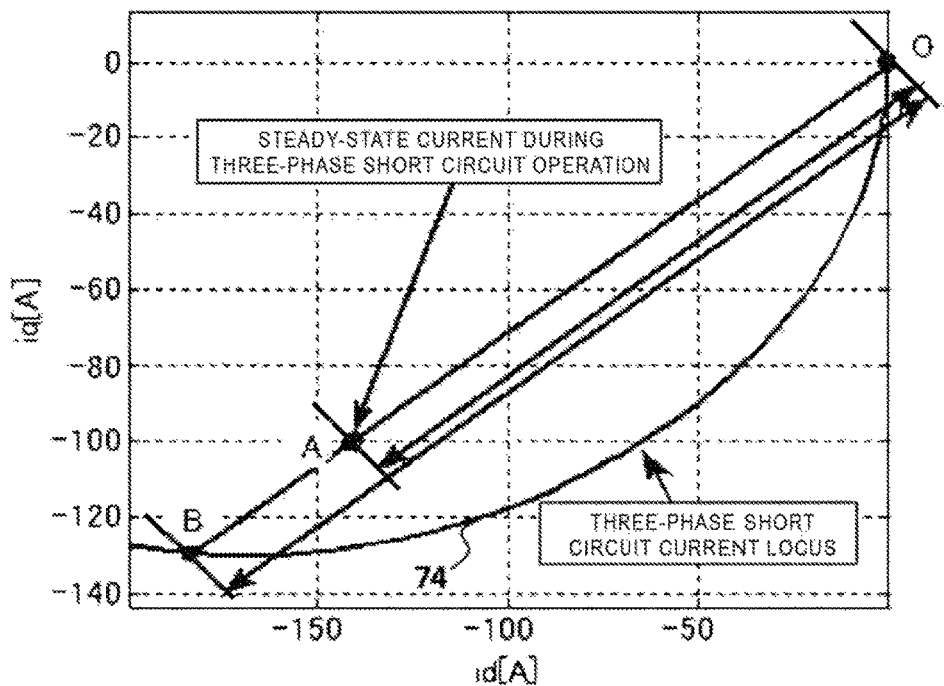
FIG. 11 is a diagram showing an example of parameters of approximate curves of three-phase short circuit current loci in the control device according to Embodiment 2 of the present invention.
FIG. 12 is an explanatory diagram for obtaining a magnet magnetic flux estimated value on the basis of a d-axis current id and a q-axis current iq by using a three-phase short circuit current locus in the control device according to Embodiment 2 of the present invention.

FIG. 11 is a diagram showing an example of parameters of approximate curves of three-phase short circuit current loci in the control device according to the present embodiment.

For performing curve approximation of the shape of a measured three-phase short circuit current locus, parameters of a curve-approximated approximate curve are set. Specifically, for example, 11 constant values of parameters p1 to p5, q1 to q4, m, and s are set, and curve approximation of the shape of the three-phase short circuit current locus is performed by the following rational function.

[Mathematical 4]

$$i_q = \frac{p_1 X^4 + p_2 X^3 + p_3 X^2 + p_4 X + p_5}{X^4 + q_1 X^3 + q_2 X^2 + q_3 X + q_4} \quad (4)$$

X in expression (4) indicates the d-axis current id that is normalized, and is provided by the following mathematical expression.

[Mathematical 5]

$$X = \frac{i_d - m}{s} \quad (5)$$

A specific example of the set values of the 11 parameters is shown in FIG. 11. The parameters at a high temperature side in FIG. 11 are approximate parameters corresponding to a three-phase short circuit current locus obtained when the magnet temperature is 57° C. which is a high temperature. The parameters at a low temperature side in FIG. 11 are approximate parameters corresponding to a three-phase short circuit current locus obtained when the magnet temperature is 28° C. which is a low temperature. The parameters at the high temperature side correspond to the three-phase short circuit current locus 72 in FIG. 9. The parameters at the low temperature side correspond to the three-phase short circuit current locus 71 in FIG. 9.

Next, a method in which the magnet state estimation unit 8 estimates the magnet state on the basis of the d-axis current id and the q-axis current iq by using a preset three-phase short circuit current locus, will be described.

FIG. 12 is an explanatory diagram for obtaining a magnet magnetic flux estimated value on the basis of dq-axis current values by using a three-phase short circuit current locus in the control device according to the present embodiment. The horizontal axis in FIG. 12 represents the d-axis current id, and the vertical axis in FIG. 12 represents the q-axis current iq. In FIG. 12, a point obtained by plotting the d-axis current id and the q-axis current iq during the three-phase short circuit operation is denoted by A. At this time, a half line OA is drawn from the origin O to A, and a point at which the half line OA intersects a preset three-phase short circuit current locus 74 is denoted by B. At this time, the ratio oft the magnet magnetic flux estimated value ΦPM during the three-phase short circuit operation; and a magnet magnetic flux ΦPM,B when the three-phase short circuit current locus 74 is obtained, is equal to the ratio of the lengths of OA and OB. Thus, the magnet magnetic flux estimated value ΦPM during the three-phase short circuit operation is obtained by: dividing the value of the magnet magnetic flux corresponding to B when the three-phase short circuit current locus 74 is obtained, that is, the magnet magnetic flux reference value ΦPM,B, by the length of OB; and multiplying the resultant value by the length of OA.

The magnet magnetic flux reference value ΦPM,B refers to a magnet magnetic flux when the three-phase short circuit current locus 74 is obtained, and is desirably a preset value. As the set value, a design value of the permanent-magnet-type synchronous machine 10, which is a driving target, is used. When the design value cannot be used, a value that is separately measured by a method such as in a no-load induced voltage test (a test in which the rotor of the synchronous machine is mechanically rotated by an externally provided torque, and the magnet magnetic flux is measured from a voltage induced at that time), is set.

In addition, the magnet magnetic flux reference value ΦPM,B corresponding to the three-phase short circuit current locus is not limited to the preset value, and may be the magnet magnetic flux estimated value ΦPM which is calculated by expression (1) or expression (2) in Embodiment 1.

Next, a method for estimating the magnet temperature will be described. The magnet temperature, that is, the magnet temperature estimated value can be calculated by using the magnet magnetic flux estimated value ΦPM obtained as described above and the method described in Embodiment 1. The magnet temperature estimated value TPM during the three-phase short circuit operation at the point A can be calculated, for example, by: assigning the magnet magnetic flux estimated value ΦPM during the three-phase snort circuit operation in FIG. 12 to the magnet magnetic flux estimated value ΦPM in expression (3) of Embodiment 1; assigning the magnet magnetic flux reference value ΦPM,B corresponding to the three-phase short circuit current locus 74 in FIG. 12 to the reference magnet magnetic flux ΦPM0 in expression (3) of Embodiment 1; and assigning a later-described magnet temperature reference value TPM,B which is preset corresponding to the three-phase short circuit current locus 74 in FIG. 12, to the reference magnet temperature TPM0 in expression (3) of Embodiment 1.

Therefore, the magnet temperature estimated value TPM can be estimated on the basis of a magnet temperature reference value corresponding to one three-phase short circuit current locus.

Hereinafter, a method for estimating the magnet temperature by using two or more three-phase short circuit current loci specific to the present embodiment, will be described with reference to FIG. 13.

Figure 13:
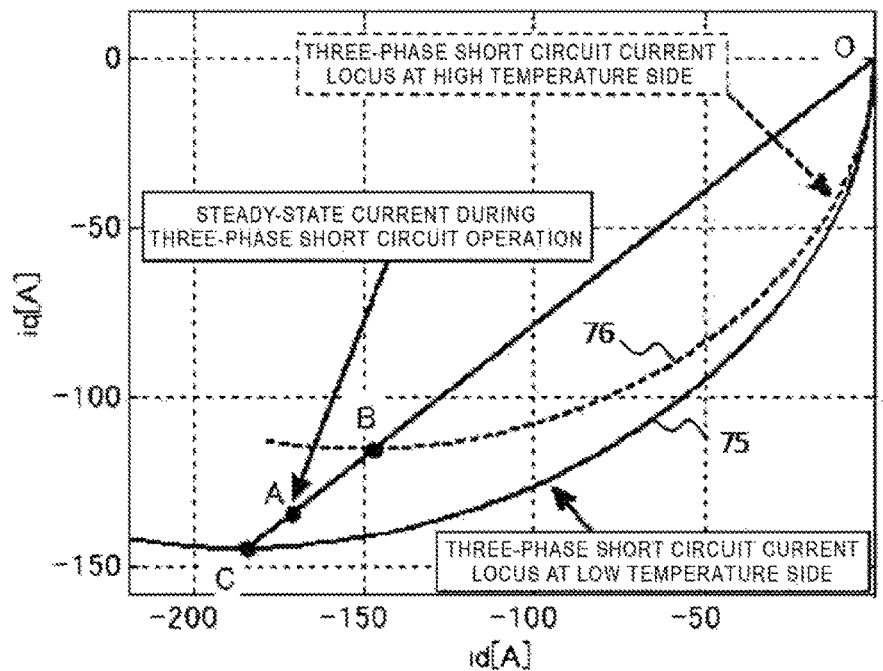
FIG. 13 is an explanatory diagram for obtaining a magnet temperature estimated value on the basis of the d-axis current id and the q-axis current iq by using three-phase short circuit current loci in the control device according to Embodiment 2 of the present invention.

FIG. 13 is an explanatory diagram for obtaining a magnet temperature estimated value on the basis of the d-axis current and the q-axis current by using three-phase short circuit current loci in the control device according to the present embodiment. The horizontal axis in FIG. 13 represents the d-axis current id, and the vertical axis in FIG. 13 represents the q-axis current iq. In FIG. 13, a point obtained by plotting the d-axis current id and the q-axis current iq during the three-phase short circuit operation is denoted by A. At this time, a half line OA is drawn from the origin O to A, a point at which the half line OA intersects a preset three-phase short circuit current locus 76 at the high temperature side is denoted by B, and a point at which the half line OA intersects a preset three-phase short circuit current locus 75 at the low temperature side is denoted by C. At this time, the ratio of the length of a line segment AB and the length of a line segment AC corresponds to the ratio of: a difference obtained by subtracting a magnet temperature TPM,C when the three-phase short circuit current locus 75 at the low temperature side is obtained from a magnet temperature estimated value TPM,A during the three-phase short circuit operation; and a difference obtained by subtracting the magnet temperature estimated value TPM,A during the three-phase short circuit operation from a magnet temperature TPM,B when the three-phase short circuit current locus 76 at the high temperature side is obtained. When the point A is closer to the origin O than the point B, the length of the line segment AB is defined to be negative. When the point A is farther from the origin O than the point C, the length of the line segment AC is defined to be negative. For calculating the magnet temperature estimated value TPM,A at the point A by using the above contents, for example, the following mathematical expression only needs to be calculated.

[Mathematical 6]

$$T_{PM,A} = \frac{T_{PM,C}(i_d - i_{d,B}) + T_{PM,B}(i_{d,C} - i_d)}{i_{d,C} - i_{d,B}} \quad (6)$$

Here, TPM,B indicates the magnet temperature when the three-phase short circuit current locus 76 at the high temperature side is obtained, that is, a magnet temperature reference value which is preset corresponding to the three-phase short circuit current locus 76. TPM,C indicates the magnet temperature when the three-phase short circuit current locus 75 at the low temperature side is obtained, that is, a magnet temperature reference value which is preset corresponding to the three-phase short circuit current locus 75. In addition, id,B indicates the d-axis current at the point B, id,C indicates the d-axis current at the point C, and id indicates the d-axis current during the three-phase short circuit operation. Instead of id,B, id,C, and id in expression (6), a q-axis current iq,B at the point B, a q-axis current iq,C at the point C, and the q-axis current iq during the three-phase short circuit operation may be used.

In addition, each of the magnet temperature reference values TPM,B and TPM,C corresponding to the three-phase short circuit current loci 75 and 76 is not limited to the preset value, and may be the magnet temperature estimated value TPM calculated by expression (3) or FIG. 7 in Embodiment 1.

In the case where the magnet temperature estimated value TPM is estimated by using expression (3) in Embodiment 1 and one three-phase short circuit current locus, nonlinearity of the relationship between the d-axis current id and the q-axis current iq, and the magnet magnetic flux, that is, the influence of magnetic flux saturation, cannot be taken into consideration in some cases.

Meanwhile, in the case where the magnet temperature estimated value TPM,A is estimated by using the two three-phase short circuit current loci 75 and 76, since the two three-phase short circuit current loci 75 and 76 are loci containing the nonlinearity of the relationship between the d-axis current id and the q-axis current iq, and the magnet magnetic flux, that is, the influence of magnetic flux saturation, the magnet temperature estimated value TPM,A can be estimated in consideration of the influence of magnetic flux saturation.

Therefore, in the case where the magnet temperature estimated value TPM,A is estimated by using the two three-phase short circuit current loci, the accuracy of estimation of the magnet temperature estimated value TPM,A improves more than in the case where the magnet temperature estimated value TPM,A is estimated by using one three-phase short circuit current locus.

The number of the magnet temperature reference values corresponding to the three-phase short circuit current loci is not limited to two as described above, and even when the number is two or more, that is, a plural number, it is possible to calculate the magnet temperature estimated value TPM,A.

For example, the case is assumed in which three magnet temperature reference values TPM,B, TPM,C, and TPM,D are preset and a point obtained by plotting the d-axis current id and the q-axis current iq during the three-phase short circuit operation is denoted by A. When the point A is present between the point B and the point C, that is, when the d-axis current id and the q-axis current iq at the point A are between the d-axis current id and the q-axis current iq ax the point B and the d-axis current id and the q-axis current iq at the point C, the magnet temperature estimated value TPM,A is estimated by expression (6), using the two magnet temperature reference values TPM,B and TPM,C.

When the point A is present between the point C and a point D, that is, when the d-axis current id and the q-axis current iq at the point A are between the d-axis current id and the q-axis current iq at the point C and the d-axis current id and the q-axis current iq at the point D, the magnet temperature estimated value TPM,A is estimated by expression (6), using the two magnet temperature reference values TPM,C and TPM,D (in expression (6), the subscript B is replaced with C, and the subscript C is replaced with D).

Therefore, even with the magnet temperature reference values respectively corresponding to a plurality of three-phase short circuit current loci, the magnet temperature estimated value TPM,A can be estimated.

Furthermore, the accuracy of estimation of the magnet temperature estimated value TPM,A improves more than in the case with two three-phase short circuit current loci. The reason why the accuracy of estimation improves is that nonlinearity of the relationship between the magnet magnetic flux (and the three-phase short circuit current locus determined by the magnet magnetic flux) and the magnet temperature is corrected.

Figure 14:
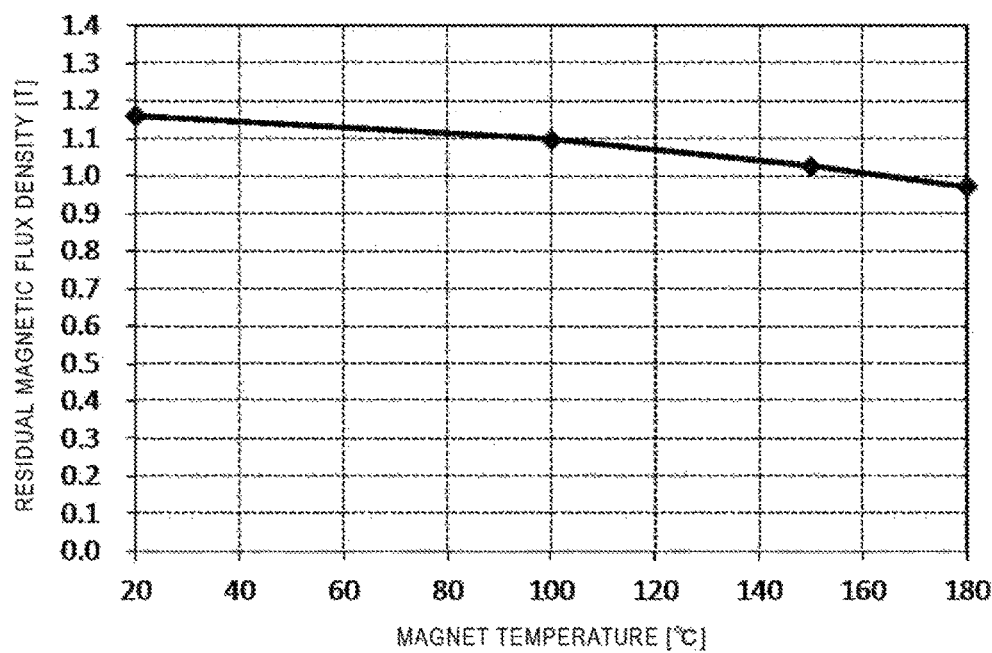
FIG. 14 is a diagram showing the temperature dependence of a residual magnetic flux density representing a magnet magnetic flux which is to be used in the control device according to Embodiment 2 of the present invention.

FIG. 14 is a diagram showing the temperature dependence of a residual magnetic flux density representing a magnet magnetic flux which is to toe used in the control device according to the present embodiment. The horizontal axis in FIG. 14 represents the magnet temperature, and the vertical axis in FIG. 14 represents an actually measured value of the residual magnetic flux density of a permanent magnet formed of a typical material. As shown in FIG. 14, with this magnet, the relationship between the magnet magnetic flux density and the magnet temperature deviates from linearity particularly as the temperature becomes higher. However, it is possible to correct the nonlinearity of the relationship between the magnet magnetic flux density and the magnet temperature toy using three or more three-phase short circuit current loci.

Next, calculation for obtaining the point of intersection between: a three-phase short circuit current locus approximated by expression (4); and a half line extended from the origin to a point obtained by plotting the d-axis current and the q-axis current during the three-phase short circuit operation, will be described below.

The magnet state estimation unit 8 performs calculation through repetitive calculation by Hewton-Raphson method. Specifically, the magnet state estimation unit 8 repeats calculation by the following mathematical expression.

[Mathematical 7]

$$X \leftarrow X - \frac{i_{d,0} p(X) - i_{q,0} q(X)(sX + m)}{i_{d,0} \frac{dp}{dX} - i_{q,0}\left(sq(X) + \frac{dq}{dX}(sX + m)\right)} \quad (7)$$

[Mathematical 8]

$$\begin{aligned} p(X) &= p_1 X^4 + p_2 X^3 + p_3 X^2 + p_4 X + p_5 \\ q(X) &= X^4 + q_1 X^3 + q_2 X^2 + q_3 X + q_4 \\ \frac{dp}{dX} &= 4 p_1 X^3 + 3 p_2 X^2 + 2 p_3 X + p_4 \\ \frac{dq}{dX} &= 4 X^3 + 3 q_1 X^2 + 2 p_2 X + p_3 \end{aligned} \quad (8)$$

Here, the symbols in expression (7) are provided by expression (8), id,0 indicates the d-axis current during the three-phase short circuit operation, and iq,0 indicates the q-axis current during the three-phase short circuit operation.

When change of X becomes substantially zero, the magnet state estimation unit 8 ends the repetitive calculation of expression (7). The number of times of the repetitive calculation may be fixed as 5.

In addition, the initial value of X is determined by the following mathematical expression.

[Mathematical 9]

$$X = \begin{cases} \frac{i_{d,min} - m}{s} & (\text{when } i_{d,0} \leq i_{d,min}) \\ \frac{i_{d,0} - m}{s} & (\text{when } i_{d,min} < i_{d,0} \leq 0) \\ -\frac{m}{s} & (\text{when } i_{d,0} > 0) \end{cases} \quad (9)$$

Here, id,min indicates the d-axis current that is the minimum on the three-phase short circuit current locus.

The three-phase short circuit current loci 71 to 76 are not limited to actually measured ones, and may be obtained by analysis.

Therefore, the control device 1 according to the present embodiment calculates the magnet magnetic flux estimated value ΦPM of the magnet magnetic flux as the magnet state by using the preset three-phase short circuit current locus 74 on the basis oft the d-axis current id and the q-axis current iq during the three-phase short circuit operation; and the d-axis current id, the q-axis current iq, and the magnet magnetic flux reference value ΦPM,B corresponding to the three-phase short circuit current locus.

That is, during the three-phase short circuit operation, the control device 1 estimates the magnet state of the permanent magnet of the permanent-magnet-type synchronous machine 10 on the basis oft the d-axis characteristic which is the d-axis current id; and the q-axis characteristic which is the q-axis current iq.

With this configuration, the control device 1 according to the present embodiment achieves the same advantageous effect as in the case of Embodiment 1 in which the magnet magnetic flux estimated value ΦPM is calculated on the basis of the d-axis current id, the preset d-axis inductance Ld, the q-axis current iq, and the preset q-axis inductance Lq.

Furthermore, even with relatively simple preparation which is pre-measurement of three-phase short circuit current loci, the magnet magnetic flux can be estimated as the magnet state in consideration of the nonlinearity of magnetic flux change. Thus, it is possible to estimate the magnet magnetic flux with higher accuracy than in Embodiment 1.

The control device 1 according to the present embodiment also calculates the magnet temperature estimated value TPM,A of the magnet temperature as the magnet state by using the preset three-phase short circuit current loci 75 and 76 on the basis of: the d-axis current id and the q-axis current iq during the three-phase short circuit operation; and the magnet temperature reference values TPM,B and TPM,C corresponding to the three-phase short circuit current loci 75 and 76.

Also with this configuration, the control device 1 according to the present embodiment achieves the same advantageous effect as in the above-described case where the magnet magnetic flux estimated value ΦPM of the magnet magnetic flux is calculated as the magnet state by using the d-axis current id, the q-axis current iq, the preset three-phase short circuit current locus 74, and the magnet magnetic flux reference value ΦPM,B corresponding to the three-phase short circuit current locus 74.

Furthermore, even with relatively simple preparation which is pre-measurement of three-phase short circuit current loci, the magnet temperature can be estimated as the magnet state in consideration of the non-linearity of magnetic flux change. Thus, it is possible to estimate the magnet temperature with higher accuracy than in Embodiment 1.

Even when the magnitude of an applied current is the same, the torque or the power generation amount of the permanent-magnet-type synchronous machine 10 varies in response to the magnet temperature. It is possible to correct the variation of the torque or the power generation amount with the magnet temperature estimated value TPM,A.

DESCRIPTION OF THE REFERENCE CHARACTERS

1 control device
2 current controller
3 dq/uvw converter
4 voltage output unit
5 current detector
6 uvw/dq converter
7 rotation speed calculator
8 magnet state estimation unit
10 permanent-magnet-type synchronous machine
11 rotation angle detector
12 adder/subtractor
41 driver circuit
42 to 47 switching element
49 PWM circuit
50 phase short circuit unit
51-1 U-phase terminal
51-2 V-phase terminal
51-3 W-phase terminal
52 power Supply
53 connection portion
54 GND
71 to 76 three-phase short circuit current locus
81 q-axis magnetic flux map
82 d-axis magnetic flux map
83 multiplier/divider
84 subtractor
85 temperature estimation map
86 switch
100 processor
101 storage unit 102 host controller
200 synchronous machine system
S301 three-phase short circuit step
S302 detection step
S303 magnet state estimation step

The invention claimed is:

1. A control device comprising a phase short circuit unit for short-circuiting three-phase terminals of a permanent-magnet-type synchronous machine having a permanent magnet, comprising:
a magnetic state estimator unit configured, during three-phase short circuit operation in which the three-phase terminals are short-circuited by the phase short circuit unit and the permanent-magnet-type synchronous machine is operated, to estimate a magnet state of the permanent magnet on the basis of:
a d-axis current flowing through the permanent-magnet-type synchronous machine during the three-phase short circuit operation;
a q-axis current flowing through the permanent-magnet-type synchronous machine during the three-phase short circuit operation; and
a magnetic characteristic of the permanent-magnet-type synchronous machine,
said magnetic characteristic corresponding to a preset three-phase short circuit current locus, which is a locus of the d-axis current and the q-axis current drawn on a dq-axis coordinate plane during a rotation speed of the permanent-magnet-type synchronous machine is externally changed, when the three-phase terminals of the permanent-magnet-type synchronous machine are short-circuited and a rotation speed of the permanent-magnet-type synchronous machine is changed.

2. The control device according to claim 1, wherein the magnetic state estimator unit is configured during the three-phase short circuit operation, to calculate a magnet magnetic flux estimated value of a magnet magnetic flux of the permanent magnet by using the preset three-phase short circuit current locus, on the basis of,
the d-axis current and the q-axis current during the three-phase short circuit operation, and
a magnet magnetic flux reference value which is the value of the magnet magnetic flux when the three-phase short circuit current locus is obtained.

3. The control device according to claim 2, wherein, the magnetic state estimator unit is configured during the three-phase short circuit operation to further calculate a magnet temperature estimated value of a magnet temperature as the magnet state by using the three-phase short circuit current locus on the basis of,
the d-axis current and the q-axis current during the three-phase short circuit operation, and
a magnet temperature reference value which is the value of the magnet temperature reference when the three-phase short circuit current locus is obtained.

4. A control device comprising a phase short circuit unit for short-circuiting three-phase terminals of a permanent-magnet-type synchronous machine having a permanent magnet, comprising:
a magnetic state estimator unit configured, during three-phase short circuit operation in which the three-phase terminals are short-circuited by the phase short circuit unit and the permanent-magnet-type synchronous machine is operated, to calculate at least one of,
a magnet flux estimated value of a magnet magnetic flux as a magnet state of the permanent magnet, and
a magnet temperature estimated value of a magnet temperature as the magnet state of the permanent magnet;
said magnetic flux estimated value calculated by using a preset three-phase short circuit current locus, which is a locus of a d-axis current and a q-axis current drawn on a dq-axis coordinate plane during a rotation speed of the permanent-magnet-type synchronous machine is externally changed, when the three-phase terminals of the permanent-magnet-type synchronous machine are short-circuited and a rotation speed of the permanent-magnet-type synchronous machine is changed, on the basis of,
the d-axis current and the q-axis current during the three-phase short circuit operation, and
a magnet magnetic flux reference value which is the value of the magnet magnetic flux when the three-phase short circuit current locus is obtained;
said magnet temperature estimated value of a magnet temperature calculated as the magnet state of the permanent magnet by using plurality of the preset the three-phase short circuit current locus on the basis of,
the d-axis current and the q-axis current during the three-phase short circuit operation, and
a magnet temperature reference value which is the value of the magnet temperature when the three-phase short circuit current locus is obtained.

5. The control device according to claim 4, wherein, the magnetic state estimator unit is configured when the magnet magnetic flux estimated value is calculated, during the three-phase short circuit operation, to further calculate the magnet temperature estimated value of the magnet temperature as the magnet state by using,
a preset reference magnet temperature,
a reference magnet magnetic flux which is preset at the reference magnet temperature, and
a preset rate of change of the magnet magnetic flux per unit change of the magnet temperature.

6. The control device according to claim 4, wherein, the magnetic state estimator unit is configured when the magnet magnetic flux estimated value is calculated, during the three-phase short circuit operation, to further calculate the magnet temperature estimated value of the magnet temperature as the magnet state by using a preset temperature estimation map on the basis of,
the d-axis current and the q-axis current during the three-phase short circuit operation, and
the magnet magnetic flux estimated value.

7. A control method in a phase short circuit unit for short-circuiting three-phase terminals of a permanent-magnet-type synchronous machine having a permanent magnet, comprising:
a three-phase short circuit step of short-circuiting three-phase terminals of a permanent-magnet-type synchronous machine having a permanent magnet during operation of the permanent-magnet-type synchronous machine;
a detection step of detecting a d-axis current and a q-axis current of the permanent-magnet-type synchronous machine when the three-phase terminals are short-circuited in the three-phase short circuit step; and
a magnet state estimation step of estimating a magnet state of the permanent magnet on the basis of: the d-axis current and the q-axis current detected in the detection step; and a magnetic characteristic of the permanent-magnet-type synchronous machine, wherein the magnet state estimation step comprises calculating a magnet temperature estimation calculated as the magnet state of the permanent magnet by using a preset three-phase short circuit current locus, which is a locus of a d-axis current and a q-axis current when the three-phase terminals of the permanent-magnet-type synchronous machine are short-circuited and a rotation speed of the permanent-magnet-type synchronous machine is changed, on the basis of, the d-axis current and the q-axis current detected in the detection step, and a magnetic temperature reference value corresponding to the three-phase short circuit current locus.

8. The control method according to claim 7, wherein a magnetic characteristic of the permanent-magnet-type synchronous machine based on a magnet magnetic flux reference value corresponds to the preset three-phase short circuit current locus.

9. The control device according to claim 4, wherein the magnetic state estimator unit comprises estimating the value of the magnet magnetic flux, by obtaining a first point obtained by plotting the d-axis current and the q-axis current on a dq-axis coordinate plane during the three-phase short circuit operation, obtaining the half line from the origin O to the first point on the dq-axis coordinate plane, obtaining a second point at which the half line intersects the preset three phase short circuit current locus on the dq-axis coordinate plane, and obtaining the value of the magnet magnetic flux by interpolating the magnet magnetic flux reference value based on the relation between the first point and the second point.

10. The control device according to claim 4, wherein the magnetic state estimator unit comprises estimating the value of the magnet temperature, by obtaining a first point obtained by plotting the d-axis current and the q-axis current on a dq-axis coordinate plane during the three-phase short circuit operation, obtaining the half line from the origin O to the first points on the dq-axis coordinate plane, obtaining second points at which the half line intersects the preset three phase short circuit current locuses on the dq-axis coordinate plane, and obtaining the value of the magnet temperature by interpolating the magnet temperature reference value based on the relation between the first point and the second points.

* * * * *